June 22, 1954

C. D. FRASER 2,681,826

COMBINATION HINGED STEP AND LOADING
PLATFORM FOR TRUCK DOORS
Filed July 22, 1952

Cecil D. Fraser
INVENTOR.

BY *Clarence A. O'Brien
and Harvey B. Jacobson*
Attorneys

Patented June 22, 1954

2,681,826

UNITED STATES PATENT OFFICE 2,681,826

COMBINATION HINGED STEP AND LOADING PLATFORM FOR TRUCK DOORS

Cecil D. Fraser, San Francisco, Calif.

Application July 22, 1952, Serial No. 300,198

6 Claims. (Cl. 296—106)

1

This invention relates in general to attachment for vehicles, and more specifically to a foldable step for attachment to commercial trucks.

The primary object of this invention is to provide a combination step and loading platform which may be selectively positioned outwardly of the body of a truck without adding to the dimensions of the truck when traveling along the road.

Another object of this invention is to provide an improved truck scaffold hinge and receiving lock which is mounted within the interior of the truck and occupies a minimum of space and at the same time is quickly and easily movable from an inoperative position to an operative position externally of the truck.

Another object of this invention is to provide an improved foldable truck step which is of a relatively simple construction and may be attached to conventional trucks in a simple operation so as to be economically feasible.

A further object of this invention is to provide an improved foldable step which is hingedly secured to one of a pair of opposed swinging doors and is adapted to have a free end thereof supported by the other of said opposed doors when in an operative position.

Figure 1:
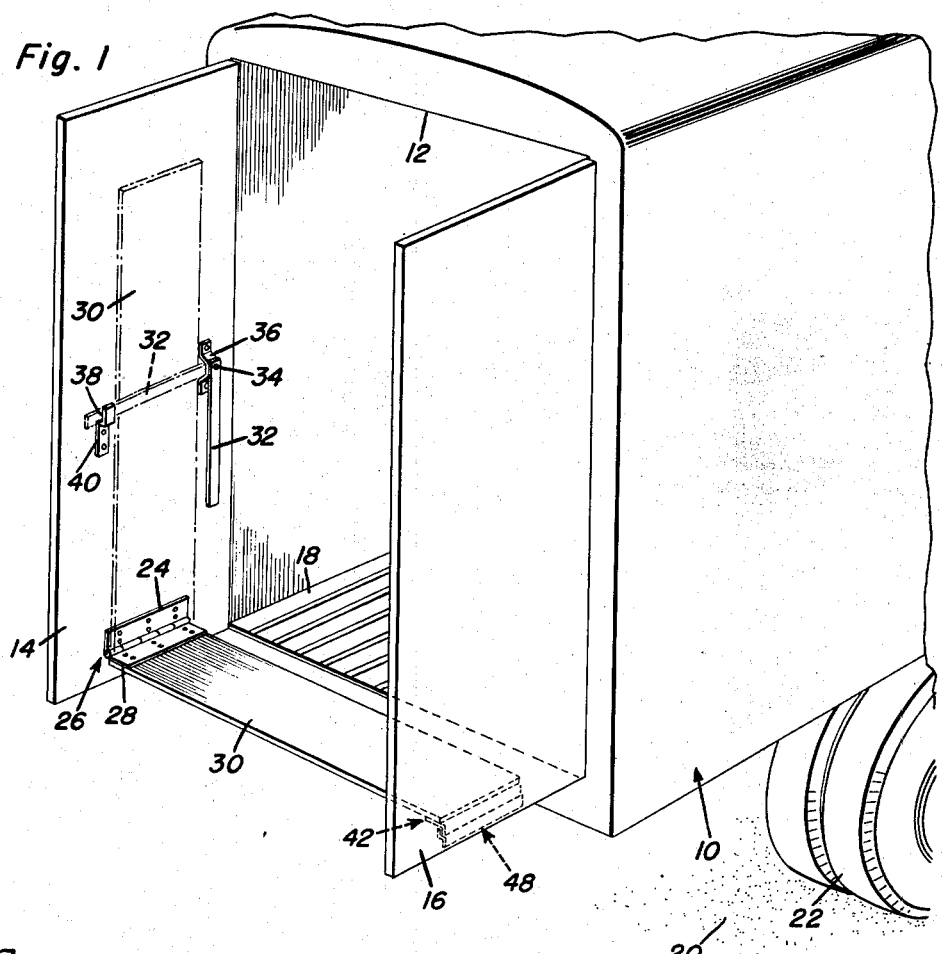
Figure 2:
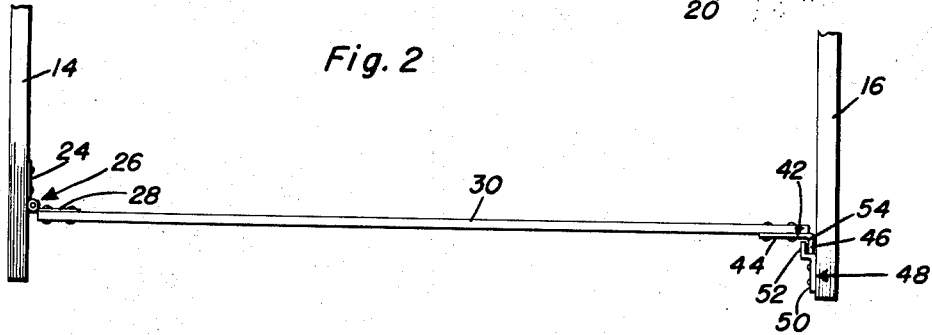

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 1 is a perspective view of the rear portion of a truck and shows the swinging rear doors of the same in an open position with the foldable step, which is the subject of this invention, disposed between the two doors and supported thereby, the inoperative position of the step being shown by dotted lines; and Figure 2 is a fragmentary rear elevational view on an enlarged scale of the rear doors of the truck of Figure 1 and shows the relationship of the step with respect to the same when the step is in its operative position.

Similar characters of reference designate similar or identical elements and portions throughout the specification and throughout the different views of the drawings.

While a truck or trailer may be conveniently loaded and unloaded at a loading platform, it will be readily seen that it is virtually impossible

2 to unload onto the street merchandise which has been piled high in the rear portion of a truck inasmuch as the uppermost merchandise cannot be reached from the level of the street. Although the provision of a simple step at the rear of the truck or trailer in alignment with the doors would normally solve this problem, it must be understood that many States have placed limits on the length of the trucks which may travel their roads with the result that it is desirable that no part of the truck which is not utilized for carrying merchandise project outwardly therefrom. Furthermore, inasmuch as the trucks are normally loaded and unloaded at loading platforms the provision of a step at the rear thereof would prevent the proper positioning of the truck with respect to the loading platform. Therefore, it is desired to provide an improved step or loading lock which may be selectively positioned adjacent the doors of a truck for loading and unloading the same on the street and at the same time being foldable to an inoperative position whereby it does not project outwardly of the body of the truck when the same is traveling along the roads.

Referring now to Figure 1 in particular, it will be seen that there is illustrated a rear portion of a conventional truck 10 which has an enlarged rear opening 12 normally closed by a pair of opposed swinging doors 14 and 16. It will be seen that when the truck 10 is loaded with merchandise which extends from the floor 18 thereof to the top of the opening 12 there is no floor space for a workman to stand and that the merchandise could not possibly be reached from the level of a street 20 on which the rear wheels 22 rest.

Secured to the inner face of the door 14 adjacent the lower end thereof is a first hinge leaf 24 of an elongated hinge which is referred to in general by the reference numeral 26. A second hinge leaf 28 thereof is rigidly connected to one end of an elongated plate in the form of a step 30 which forms the receiving lock for the truck 10 when it is being loaded or unloaded on a street. The step 30 is normally disposed in a vertical position as illustrated by dotted lines in Figure 1 and is in face to face relation with the inner face of the door 14.

When the step 30 is in a vertical inoperative position, it is retained in that position by a bar 32 pivotally connected by a pivot pin 34 to a generally U-shaped bracket 36 carried by the door adjacent one edge thereof. In alignment with the pivot pin 34 is a socket 38 formed by a generally Z-shaped fitting 40 which has one flange thereof secured to the inner face of the door 14 and the other flange thereof in spaced parallel relation thereto. It will be seen that when the bar 32 is pivoted to a horizontal position, as illustrated by dotted lines, it engages the step 30 and retains the same in face to face engagement with the inner face of the door 14.

Referring now to Figure 2 in particular, it will be seen that the other end of the step 30 has secured to the underside thereof an L-shaped member which is referred to in general by the reference numeral 42. The L-shaped member 42 extends the full width of the step 30 and includes a flange 44 secured to the underside thereof and a second flange 46 at right angles to the flange 44 and extending downwardly from the underside of the step 30 when the same is in a horizontal position. The other door 16 has secured thereto adjacent the lower edge thereof an elongated Z-shaped member which is referred to in general by the reference numeral 48. The Z-shaped member includes a first flange 50 which is secured in face to face relation to the inner face of the door 16 and an offset flange 52 which is in spaced parallel relation to the inner face of the door 16 and forms in combination therewith a socket 54 for receiving the flange 46.

It will be seen that when the doors 14 and 16 are in their open position the step 30 may extend between the same and be rigidly supported thereby. When the step 30 is so positioned, a workman unloading the truck 10 may stand thereon and reach any of the merchandise which has been loaded into the rear portion of the truck. Furthermore, inasmuch as the doors 14 and 16 are disposed at the ends of the step 30 a workman is prevented from accidentally falling off of the ends of the step by the doors.

While the step 30 has been illustrated and described as being attached to the doors at the rear of the truck 10, it will be understood that the step 30 is not limited to doors so placed as it may also be utilized with opposed swinging doors mounted in the sides of trucks and trailers.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. In a vehicle having opposed swinging doors, a hinged step, said hinged step being hingedly secured at one end to one door and movable from a vertical position to a horizontal position for forming a step positioned outwardly of the vehicle when the doors are open, support means carried by the other of said doors for selectively supporting the other end of said step.

2. In a vehicle having opposed swinging doors, a hinged step, said hinged step being hingedly secured at one end to one door and movable from a vertical position to a horizontal position for forming a step positioned outwardly of the vehicle when the doors are open, support means carried by the other of said doors for selectively supporting the other end of said step, latch means for retaining said step in inoperative position.

3. In a vehicle having opposed swinging doors, a hinged step, said hinged step being hingedly secured at one end to one door and movable from a vertical position to a horizontal position for forming a step positioned outwardly of the vehicle when the doors are open, the other end of said step being provided with a downwardly projecting portion adapted to engage in a socket carried by the other of said doors for supporting said other end of the step.

4. In a vehicle having opposed swinging doors, a hinged step, said hinged step being hingedly secured at one end to one door and movable from a vertical position to a horizontal position for forming a step positioned outwardly of the vehicle when the doors are open, a bar pivotally connected to said one door at one end adapted to engage said step when in an inoperative position to retain the same in such a position, the other end of said bar being adapted to be received in a socket carried by said one door.

5. In a vehicle having opposed swinging doors, a hinged step, said hinged step being hingedly secured at one end to one door and movable from a vertical position to a horizontal position for forming a step positioned outwardly of the vehicle when the doors are open, the other end of said step being provided with a downwardly projecting portion adapted to engage in a socket carried by the other of said doors for supporting said other end of the step, said socket being formed by a Z-shaped cross sectional strip secured to said other door below the horizontal plane of a hinge connecting said step to said one door.

6. In a vehicle having opposed swinging doors, a hinged step, said hinged step being hingedly secured at one end to one door and movable from a vertical position to a horizontal position for forming a step positioned outwardly of the vehicle when the doors are open, the other end of said step being provided with a downwardly projecting portion adapted to engage in a socket carried by the other of said doors for supporting said other end of the step, said socket being formed by a Z-shaped cross sectional strip secured to said other door below the horizontal plane of a hinge connecting said step to said one door, said downwardly projecting portion being formed by one flange of an angle member secured to the underside of said step.

References Cited in the file of this patent

UNITED STATES PATENTS

| Number | Name | Date |
|---|---|---|
| 461,739 | Crumbaugh | Oct. 20, 1891 |
| 1,919,986 | Powers | July 25, 1933 |
| 1,952,883 | Nelson | Mar. 27, 1934 |
| 2,498,161 | Hamilton | Feb. 21, 1950 |

FOREIGN PATENTS

| Number | Country | Date |
|---|---|---|
| 262,120 | Italy | Sept. 17, 1927 |
| 329,455 | Germany | Nov. 26, 1920 |